3,128,247
ION EXCHANGE
Pierre Cohen, Neuilly-sur-Seine (Seine), and Rene Amavis, Wissous, Seine-et-Oise, France, assignors to Commissariat à l'Energie Atomique, Paris, France
No Drawing. Filed Nov. 7, 1960, Ser. No. 67,460
Claims priority, application France Nov. 16, 1959
12 Claims. (Cl. 210—37)

The present invention relates to ion exchange and provides a new means to those at present available for this purpose.

The first ion exchangers, constituted by natural zeolitic materials, have been supplanted by synthetic resins carrying functional groups, because of the greater exchange capacity of the latter. Synthetic resins, however, have certain limitations which render them unsuitable for certain uses. They undergo degradation under the influence of atomic radiations and cannot be used at elevated temperatures.

The invention overcomes these disadvantages by providing new ion exchangers.

It has been discovered that basic lead sulphates prepared by the wet process have ion exchange properties and can be utilised both as anion exchangers or as cation exchangers, according to the pH of the medium with which they are in contact. This functional duality (connected with stability to radiations and to temperature) of basic lead sulphates renders them particularly interesting as ion exchangers.

The invention thus consists in the application of basic lead sulphates for ion exchange. It also envisages a process of treatment of a liquid with a view to eliminating certain ions by means of basic lead sulphates.

The ion exchange properties are possessed by all basic lead sulphates which correspond to a general formula, resulting from quantitative analysis, of the form $$PbSO_4 \cdot nPbO \cdot n'H_2O$$

this formula is not intended to represent the structure of such compounds, various properties of these materials, particularly their ion exchange properties, allowing it to be assumed for example that they can also be represented by the formula: (in the case where $n' >$ than $n$)

$$PbSO_4 \cdot nPb(OH_2) \cdot (n'-n)H_2O$$

It has been noticed frequently, in relation to the preparation of these compounds, that the number of $H_2O$ molecules is equal to that of the PbO molecules, so that these compounds thus correspond to the formula $$PbSO_4 \cdot nPb(OH)_2$$

It seems also that the latter compounds are most often a mixture of basic lead sulphates, for which $n$ has an integral value of 1, 2, 3 or 4, the number $n$ of the foregoing formula thus representing a mean value. When this mean value is equal or substantially equal to 3, the compound can be represented by the formula $$PbSO_4 \cdot 3Pb(OH)_2$$

this compound is referred to as "tribasic lead sulphate" in the following description.

This tribasic lead sulphate has ion exchange properties over a more extended pH range as compared with other basic lead sulphates and a higher exchange capacity.

Tribasic lead sulphate, as usually prepared, is stable in acid or basic media, of a concentration lower than or equal, in the case of an acid or strong base which are completely dissociated, to 0.1 N. In the form of a powder, it can be formed into ion exchange columns. It is also advantageously associated with sand or other inert, granular material, when it has the form of a very fine powder, to give satisfactory percolation speeds to the liquid to be treated. In acid media, this sulphate operates as an anion exchanger, its exchange capacity being higher as the pH is lower.

This is evidenced by the following table. One gram of tribasic lead sulphate powder was agitated with 100 cm.³ of 0.1 N NaCl solution, until fixation saturation was reached, the pH of the solution being adjusted with hydrochloric acid to different values for each experiment.

| pH | Anion exchange capacity in meq./g.[1] |
|---|---|
| 1 | 8.5 |
| 1.7 | 5.85 |
| 5.6 | 2.04 |
| 6.1 | 1.85 |
| 6.3 | 1.0 |
| 6.7 | 0.82 |

[1] Milliequivalents-gram of ions fixed per gram of ion exchanger.

It has also been verified that, at pH 1.7, tribasic lead sulphate powder has the same capacity for the anions $Cl^-$, $SO_4^{--}$ and $NO_3^-$.

In a substantially neutral or basic medium, tribasic lead sulphate operates as a cation exchanger; in a basic medium, its exchange capacity is greater as the pH is higher.

This appears from the following table, drawn up in operative conditions which are analogous to those mentioned above, except that the NaCl is replaced by 0.1 N ammonium acetate and the pH is adjusted by means of ammonia.

| pH | Cation exchange capacity in meq./g.[1] |
|---|---|
| 12.5 | 7.5 |
| 11.0 | 7.2 |
| 10.0 | 5.4 |
| 9.0 | 2.45 |
| 7.2 | 0.19 |
| 6.3 | 0.11 |

[1] Milliequivalents-gram of ions fixed per gram of ion exchanger.

It is also to be noted that, at a pH around 7, the amounts of cationic exchange capacity depend upon the nature of the cation utilised:

$$NH_4^+ < Ca^{++} < [Co(NH_3)_6]^{+++}$$
$$(0.11) \quad (0.8) \quad (0.9)$$

Tribasic lead sulphate operates as a true ion exchanger because, like a synthetic organic ion exchanger, it fixes ions in a prefectly reversible manner.

The following experiment shows this: It was carried out on a column of powder (10 grams) with an 0.1 meq./cc. NaCl solution meq./cc. is the milliequivalents-gram of ions fixed per cm.³ of salt solution, adjusted to pH 11 with caustic soda, and containing radioactive strontium ($Sr^{90}$). The powder had previously been saturated with $Na^+$ ions with an analogous solution not containg $Sr^{90}$. The radioactive solution was then supplied until the effluent radioactivity was equal to the entering radioactivity. The $Sr^{90}$ was then eluted with an analogous, but non-radioactive solution. It was found that the coefficients of separation of the $Sr^{90}$ between the solution and the powder were the same in the two cases of fixation and elution.

The equilibrium constant is $K_{Sr=Na} = 2.1 \times 10^{-3}$ (in the conditions of pH and salinity indicated above). It is much lower than with a synthetic resin; an inverse result is obtained in the case of cerium-sodium exchange.

Other basic lead sulphates have analogous properties to those described above for tribasic lead sulphate; in particular:

In acid media, the anion exchange capacity increases as the pH decreases;

In basic media, the cation exchange capacity increases as the pH increases;

In acid media, the anion exchange capacity is substantially the same for the anions $Cl^-$, $SO_4^{--}$ and $NO_3^-$;

In basic or neutral media, the cation exchange capacity depends on the nature of the cation;

Fixation of the ions is reversible.

The affinity of the basic lead sulphate powder for cerium in an alkaline medium (pH=11) containing 0.1 meq./cc. of $Na^+$, where meq./cc. is the milliequivalents-gram of ions fixed per cm.$^3$ of salt solution can be used advantageously for the separation of the rare earths; in this medium, the ratio of the coefficients of separation, $Kd$, of two rare earths is sufficiently high to provide a good separation thereof. In fact:

$$\frac{Kd_{Ce}}{Kd_{Pm}}=26 \qquad \frac{Kd_{Ce}}{Kd_Y}=47 \qquad \frac{Kd_{Pm}}{Kd_Y}=1.8$$

Ion exchangers constituted by basic lead sulphates can be used in various fields for purification of liquors and, particularly, in the case of radioactive liquors. Their stability at high temperature permits utilisation in the case of purification of radioactive liquors at high temperature. Their stability to radiations also permits their utilisation in certain phases of the treatment of irradiated nuclear fuel (separation of plutonium in a nitric medium).

On the other hand, basic lead sulphates in alkaline form have an alkaline reaction which can be used advantageously as a buffer effect for maintaining cooling water at a certain pH and for preventing it becoming corrosive.

The following examples illustrate, without limitation, certain practical applications of basic lead sulphates as ion exchangers.

Example I

Residuary liquors obtained from the preparation of $I^{131}$ from irradiated tellurium can contribute in a very considerable manner to pollution of radioactive liquors issuing from a nuclear research centre (50% in certain cases). The coprecipitation treatment of these liquors, containing essentially radio-isotopes of tellurium, is only slightly effective or dangerous (for example by precipitation with lead sulphate).

According to the process of the invention, the residual liquors mentioned above have been treated, which contained $SO_4^{--}$, $TeO_4^{--}$, $Na^+$ and $Ca^{++}$ and had a pH equal to 2. For this purpose, the liquors were agitated with 2500 p.p.m. of a basic lead sulphate powder have the following analysis:

|  | Percent by weight |
|---|---|
| $PbSO_4$ | 29,2 |
| $Pb(OH)_2$ | 70.8 |

The powder thus contained 3.05 mols $Pb(OH)_2$ per molecule of $PbSO_4$. It was maintained in contact with the liquid until the radioactivity of the latter no longer changed.

Following this treatment, it was found in the liquor that the decontamination had a factor $F_D$ of 45. This factor is defined as follows:

$$F_D = \frac{\text{specific activity of liquid before treatment}}{\text{specific activity of liquid after treatment}}$$

Example II

Basic lead sulphate also permits decontamination of the residuary liquors from the preparation of $P^{32}$.

990 p.p.m. of the powder utilised in Example I allowed an $F_D$ of 187 to be obtained, while an anionic organic synthetic resin under the same conditions gave an $F_D$ of only 10.

Example III

The cationic and anionic ion exchange properties of the basic sulphate powder allow it to be used twice for the purification of radioactive residual liquors: once in an acid medium for elminating radioactive anions and a second time in a basic medium for removing radioactive cations.

In an acid medium, therefore, radioactive anions obtained from the preparation of $I^{131}$ have been removed and then the same powder has been utilised for the purification of basic residual solutions containing $Ce^{144}$.

An acid residual solution containing isotopes of tellurium and analogous to that of Example I was marked with $Ce^{144}$. This solution was agitated two hours with 2500 p.p.m. of the same powder as in Example I. By anionic exchange, an $F_D$ equal to 45 for Te was obtained, while in an acid medium the cerium was not removed.

The solution was then neutralised with caustic soda to a pH equal to 10.8, which had the effect of causing for precipitation a partial decontamination of cerium $$(F_D\ Ce=13.5)$$

After decantation or filtration of the precipitate, the neutralised solution was contacted with the powder which had previously served for fixation of tellurium; a more complete decontamination of cerium then took place with a factor $F_D$ equal to 60 without any elution of the tellurium. For the two operations together, precipitation and fixation, the factor $F_D$ is thus equal, for cerium, to 810.

Example IV

The treatment of Example I was carried out with a basic lead sulphate powder in which the analysis revealed an overall content of 2.94 mols $Pb(OH)_2$ per 1 mol $PbSO_4$. The decontamination factor attained was 42.

Example V

The treatment of Example I was carried out with a basic lead sulphate powder having the following analysis:

|  | Percent by weight |
|---|---|
| $PbSO_4$ | 53 |
| $Pb(OH)_2$ | 47 | namely having an average 1.12 mols $Pb(OH)_2$ per 1 mol $PbSO_4$. A decontamination factor $F_D=38$ was obtained.

Example VI

As in Example I, the powder described was replaced by another in which the average content of $Pb(OH)_2$ was 2.09 mol per 1 mol $PbSO_4$. The decontamination factor was $F_D=40$.

Example VII

In an operation similar to that of Example II, basic sulphate powder was used in which the $Pb(OH)_2$ content was 2.94 mols per 1 mol $PbSO_4$. $F_D=182$ was obtained.

It will be understood that the invention is not limited to the operations described, which have been given merely by way of example. In particular, within the field of purification of radioactive residual liquors, other cases than those which have been given in Example 3 can be contemplated for the bivalent utilisation of the same quantity of basic lead sulphate.

What we claim is:

1. In a process for ion exchange of an aqueous solution containing at least one dissolved electrolyte, the step of contacting the solution with a powder including a basic hydrated sulfate of lead, the pH of the solution having a value from 7 to less than 7, said powder being relatively insoluble in the solution.

2. In a process for cation exchange in an aqueous solution containing at least one dissolved electrolyte, the step of contacting the solution with a powder including a basic hydrated sulfate of lead, the pH of the solution having a value between 7 and a value greater than 7, said powder being relatively insoluble in the solution.

3. In a process for ion exchange in an aqueous solution containing at least one dissolved electrolyte, the steps of contacting the solution with a powder including a basic hydrated sulfate of lead, the pH of the solution having a value between 7 and a value less than 7, the powder being relatively insoluble in the solution, then adjusting the pH of the solution between 7 and the value greater than 7 and then contacting the solution with the same powder, the powder being relatively insoluble in the solution having a pH of 7 and above.

4. In a process for ion exchange in an aqueous solution containing at least one dissolved electrolyte, the steps of contacting the solution having a pH from 7 to a value greater than 7 with a powder including a basic hydrated sulfate of lead, the powder being relatively insoluble in the solution, then adjusting the pH of the solution to values from 7 to less than 7 and contacting the solution with the same powder, the powder being relatively insoluble in the solution having a pH from 7 to less than 7.

5. In a process for ion exchange in an aqueous solution containing at least one dissolved electrolyte, the step of contacting the solution with a powder including hydrated tribasic sulfate of lead, the solution having a pH between 7 and 1.

6. In a process for the exchange of cations in an aqueous solution containing at least one dissolved electrolyte, the step of contacting the solution with a powder including hydrated tribasic sulfate of lead, the solution having a pH between 7 and 13.

7. In a process for the exchange of ions in an aqueous solution containing at least one dissolved electrolyte, the steps of contacting the solution with a powder containing hydrated tribasic sulfate of lead, the solution having a pH between 7 and 1, then adjusting the pH of the solution between 7 and 13, and then contacting the solution with the powder.

8. In a process for the exchange of ions in an aqueous solution containing at least one dissolved electrolyte, the steps of adjusting the pH of the solution between 7 and 13, then contacting the solution with a powder including a hydrated tribasic sulfate of lead, then adjusting the pH of the solution between 7 and 1 and then contacting the solution with the powder.

9. In a process for the exchange of ions in an aqueous solution containing at least one radioactive cation and at least one radioactive anion, the steps of contacting the solution with a powder containing basic hydrated sulfate of lead, the solution having a pH between 7 and a value less than 7, the powder being relatively insoluble in the solution, then adjusting the pH of the solution to a value from 7 to a value greater than 7 and then contacting the solution with the powder, the powder being relatively insoluble in the solution having a pH from 7 to a value greater than 7.

10. In a process for the exchange of ions in an aqueous solution containing at least one radioactive cation and at least one radioactive anion, the steps of adjusting the pH of the solution from 7 to values greater than 7, then contacting the solution with a powder containing basic hydrated sulfate of lead, the powder being relatively insoluble in the solution, then adjusting the pH of the solution from 7 to values less than 7, and then contacting the solution with the powder, the powder being relatively insoluble in the solution having a pH from 7 to less than 7.

11. An ion exchange material comprising a mixture of a powder of basic hydrated sulfate of lead and a powder of an inert material.

12. A process for the exchange of ions in an aqueous solution containing cations selected from the group consisting of $NH_4^+$, $Ca^{++}$, $[Co(NH_3)_6]^{+++}$, $Sr^{++}$, $Ce$, $Pm$, $Y$, $Na^+$ and anions selected from the group consisting of $Cl^-$, $SO_4^{--}$, $NO_3^-$, $TeO_4^{--}$, the steps of contacting the solution with a powder containing basic hydrated sulfate of lead, the solution having a pH from 7 to a value less than 7, the powder being relatively insoluble in the solution, then adjusting the pH of the solution from 7 to values greater than 7 and then contacting the solution with the powder, the powder being relatively insoluble in the solution.

References Cited in the file of this patent

UNITED STATES PATENTS

| | | |
|---|---|---|
| 2,872,333 | Adams | Feb. 3, 1959 |
| 2,895,798 | Blanco | July 21, 1959 |
| 2,966,395 | Carbotti | Dec. 27, 1960 |
| 2,981,776 | Dunn et al. | Apr. 25, 1961 |